US012588648B2

(12) United States Patent
  Brush

(10) Patent No.: US 12,588,648 B2
(45) Date of Patent: Mar. 31, 2026

(54) DISPOSABLE LITTER TRAY

(71) Applicant: Radio Systems Corporation, Knoxville, TN (US)

(72) Inventor: Marc Brush, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 398 days.

(21) Appl. No.: 18/096,205

(22) Filed: Jan. 12, 2023

(65) Prior Publication Data

US 2023/0232782 A1    Jul. 27, 2023

Related U.S. Application Data

(60) Provisional application No. 63/298,728, filed on Jan. 12, 2022.

(51) Int. Cl.
  *A01K 1/01*    (2006.01)
(52) U.S. Cl.
  CPC ................................. *A01K 1/0125* (2013.01)
(58) Field of Classification Search
  CPC ............................ A01K 1/0125; A01K 1/0107
  USPC ..... 119/168; 220/62.1, 62; 229/103, 122.32, 229/117.14
  See application file for complete search history.

(56) References Cited

U.S. PATENT DOCUMENTS 2,074,638 A * 3/1937 Black ................. B65D 5/46128
                                                          229/117.14
2,387,482 A * 10/1945 Vineberg ............... A45C 11/02
                                                          229/122.23
2,547,849 A * 4/1951 Barry ..................... B65D 5/321
                                                          229/172
3,219,179 A * 11/1965 Tuccio .................... A47J 47/14
                                                          206/541
3,442,371 A * 5/1969 Deshong ................ B65D 75/28
                                                          206/45.23
3,581,975 A * 6/1971 Riccio .................. B65D 5/0005
                                                          229/101
4,807,563 A * 2/1989 Berry ................... A01K 1/0125
                                                          229/101
5,007,530 A * 4/1991 Weismantel ......... B65D 5/5206
                                                          206/45.21
5,647,595 A * 7/1997 Knickerbocker ..... A63F 7/0023
                                                          220/62.1

(Continued)

*Primary Examiner* — Peter M Poon
*Assistant Examiner* — Shada Mohamed Alghailani
(74) *Attorney, Agent, or Firm* — Baker, Donelson, Bearman, Caldwell & Berkowitz, PC

(57)          ABSTRACT

A pet litter tray includes a main housing, a pair of oppositely disposed side flaps, and a pair of oppositely disposed end flaps. The main compartment has an interior space and an open top or top opening. The main compartment has a generally planar, rectangular floor, two oppositely disposed side walls, and two oppositely disposed end walls. Each end flap has an elongated tab mounting slot. Each side flap has a first portion extending from the side wall of the main compartment along the longitudinal first fold, a second portion extending from the first portion along a second fold, a third portion extending from the second portion along a longitudinal third fold, and a distal, fourth portion extending from the third portion along a longitudinal fourth fold. The fourth portion has two oppositely disposed end tabs and a central handle portion having a handle hole therethrough.

14 Claims, 8 Drawing Sheets

(56)                     References Cited

U.S. PATENT DOCUMENTS

| | | | |
|---|---|---|---|
| 5,785,001 A * | 7/1998 | Robinson .............. | A01K 1/0125 |
| | | | 229/101 |
| 5,845,601 A * | 12/1998 | Robinson .............. | A01K 1/0125 |
| | | | 119/168 |
| 6,581,823 B1 * | 6/2003 | De Beck .............. | B65D 5/6664 |
| | | | 229/117.14 |
| 7,587,883 B2 * | 9/2009 | Cook ..................... | B65D 47/12 |
| | | | 53/484 |
| 10,524,447 B1 * | 1/2020 | Tayebi ................. | A01K 1/0125 |
| 2011/0233264 A1 * | 9/2011 | Lombardi ................ | B65D 5/20 |
| | | | 229/120.24 |
| 2013/0161377 A1 * | 6/2013 | Nebeker ................ | B65D 5/425 |
| | | | 229/162.1 |
| 2017/0042114 A1 * | 2/2017 | Waid .................... | A01K 1/0114 |

* cited by examiner

R

LB

TC

10

DISPOSABLE LITTER TRAY

CROSS REFERENCE TO RELATED APPLICATIONS

Applicant claims the benefit of U.S. Provisional Patent Application Ser. No. 63/298,728 filed Jan. 12, 2022 and entitled "Disposable Litter Tray".

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

FIELD OF THE INVENTION

The present inventive concept relates to the field of pet litter boxes. More particularly, the invention relates to a pet litter tray that is disposable and may be used in conjunction with a litter box.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Pet owners, and especially cat owners, typically have a litter box within the home to accommodate the daily functions of a cat. These litter boxes have a generally rigid box or housing that contains a flexible plastic liner in which resides a mass of granular kitty litter.

It is imperative that the litter box be cleaned periodically to remove the animal waste from the kitty litter in order to promote the health and well-being of the animal as well as keeping the home sanitary and odor-free. Consequently, a cat owner must be extremely conscientious about cleaning or replacing kitty litter on a timely basis. However, this task is unpleasant, which may result in a delay in completing replacement of the kitty litter.

The task of changing the kitty litter may also create a mess for the cat owner or homeowner. When removing the kitty litter or combination kitty litter and liner from the box, the kitty litter may spill, creating a mess that the homeowner must then clean. Also, with the use of liners, the homeowner must tie off the liner to prevent spilling of the kitty liner. Again, this is a task that the homeowner finds unpleasant.

Some pet litter boxes include a removable tray that is intended to aid in the disposal of the spent kitty litter. While such trays do make handling easier, they are still susceptible to many of the problems previously recited.

A need therefore exists for an improved pet litter box or tray which enables a homeowner to dispose of used kitty litter quickly and easily. It is to the provision of such therefore that the present invention is primarily directed.

SUMMARY OF THE INVENTION

A disposable litter box comprises a main housing having two oppositely disposed end walls, two oppositely disposed side walls extending between the end walls, and a floor extending between end walls and the side walls, the main housing forming a top opening defined by the end walls and the side walls. The disposable litter box also has two oppositely disposed side flaps, each the side flap extending from one the side wall, each the side flap having a first portion extending from one the side wall along a first fold to be movable from an in-use position overlaying the floor to a stowed position overlaying the one side wall, a second portion extending from the first portion along a second fold to be movable from an in-use position overlaying the floor to a stowed position positioned over a first section of the main housing top opening, a third portion extending from the second portion along a third fold to be movable from an in-use position overlaying the first portion and the second portion and a stowed position over a second section of the main housing top opening, and a fourth portion extending from the third portion along a fourth fold to be movable from an in-use position overlaying the one side wall and a stowed position over the third portion.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
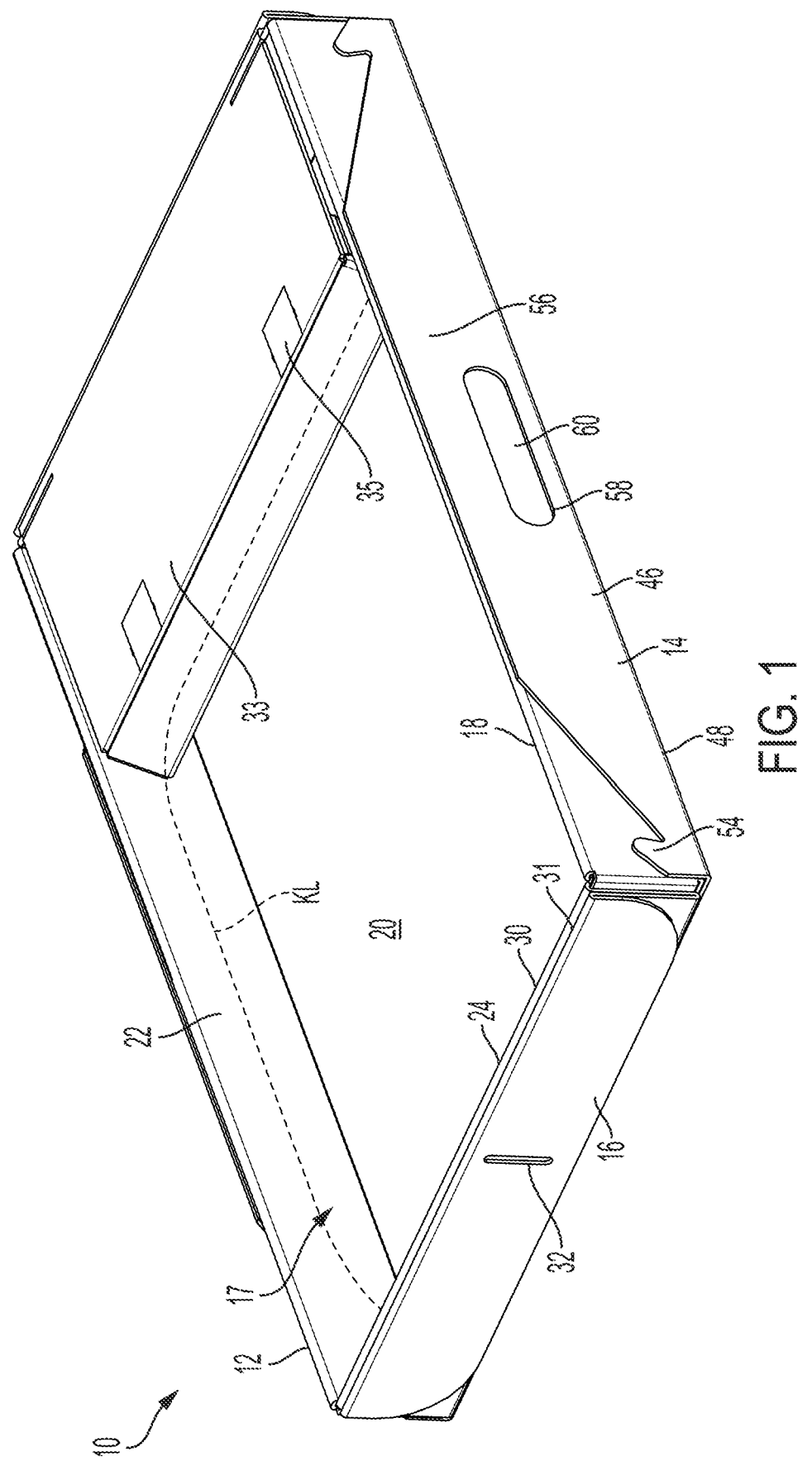
FIG. 1 is a perspective view of a pet litter tray embodying principles of the invention in a preferred form, shown in an in-use configuration.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is a shown a pet litter tray 10 embodying principles of the invention in a preferred form. The pet litter tray 10 is intended to be used in conjunction with a pet litter box LB having a tray compartment TC, however, the pet litter tray 10 may be used alone. The pet litter box LB may also include a reciprocating rake R that moves pet waste or clumped kitty litter KL to one side or end of the pet litter tray 10.

The pet litter tray 10 includes a main compartment, housing or box 12, a pair of oppositely disposed side flaps 14, and a pair of oppositely disposed end flaps 16. The main compartment 12 has an interior space 17 and an open top or top opening 18.

The main compartment 12 has a generally planar, rectangular floor 20, two oppositely disposed side walls 22 extending upwardly from the floor 20, and two oppositely disposed end walls 24 extending upwardly from the floor 20. Each side flap 14 extends from a lower edge or fold of a side wall 22 along a first fold or score-line 36. Each end flap 16 extends from an upper edge 30 of an end wall 24 along an end fold 31. Each end flap 16 has an elongated tab mounting slot 32 extending therethrough, wherein the slot 32 may be generally rectangular in shape or may be a modified rectangular shape having an enlarge center portion to aid in passing the end tabs 54 therethrough. Each end flap 16 is releasably secured to the exterior surface of the adjoining end wall 24 through releasable end fasteners 39. The end fasteners 39 may be any conventionally known fastener, such as hook and loop fasteners, double sided tape, an adhesive dot, adhesive fasteners, magnetic fasteners, or the like.

The main compartment 12 also has a waste covering panel or shield 33 extending inwardly or inboard from one end wall 24. The waste covering shield 33 may include a small amount or patch of ferrous or other metallic material 35 that interacts with a magnetic portion of the pet litter box LB that moves the waste covering shield 33 upwardly when the reciprocating rake R is activated in order to move pet waste or clumped kitty litter to a position beneath the waste covering shield 33.

Each side flap 14 has a proximal, first portion 34 extending laterally from the side wall 22 of the main compartment 12 along the longitudinal first fold or score-line 36, a second portion 38 extending laterally from the first portion 34 along a longitudinal second fold or score-line 40, a third portion 42 extending laterally from the second portion 38 along a longitudinal third fold or score-line 44, and a distal, fourth portion 46 extending laterally from the third portion 42 along a longitudinal fourth fold or score-line 48. The first portions 34, second portions 38 and third portions 42 are all generally rectangular in shape and aligned longitudinally along or parallel to the side walls 22. The fourth portion 46 has two oppositely disposed end tabs 54 and a central handle portion 56 having a handle hole or opening 58 therethrough. The handle opening 58 may be formed by partially cutting the perimeter of the opening 58 so as to leave a pivotable opening flap 60, the pet litter tray 10 may include only one or both flaps 60 as only one flap 60 is necessary to maintain the fourth portions 46 together. The fourth portion 46 also has two spaced apart first fasteners 62 mounted to the interior surface 64 of the side flap 14. The first fasteners 62 are configured and positioned to releasable mate with two second fasteners 66 mounted to the exterior or outboard surface 68 of the side wall 22 of the main compartment 12. The first and second fasteners 62 and 66 may be any conventionally known fastener, such as hook and loop fasteners, double sided tape, an adhesive dot, adhesive fasteners, magnetic fasteners, or the like.

The entire pet litter tray 10 may be formed from a single or unitary blank or sheet of cardboard, paperboard, or other similar material. The paper based sheet may be treated to have a moisture repelling coating, such as a wax coating, to prevent pet urine from soaking into and weakening the pet litter tray 10. Under an embodiment, the pet litter tray 10 comprises a plastic sheet adhered to the floor 20 to improve the moisture resistance and scratch resistance of the tray.

Figure 2:
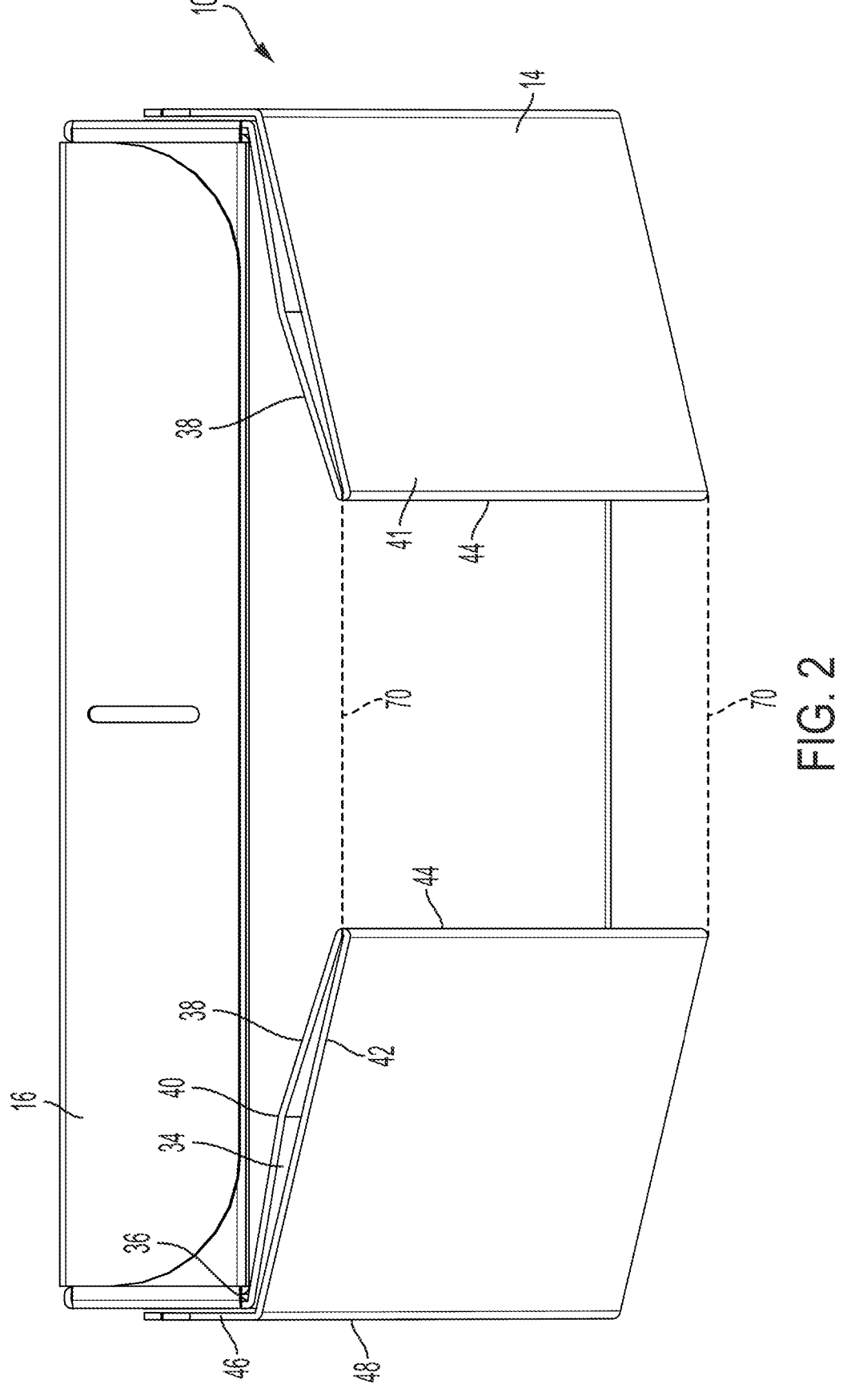
FIG. 2 is a perspective end and bottom view of the pet litter tray of FIG. 1.
Figure 7:
FIG. 7 is a perspective view of a pet litter tray of FIG. 1, shown being coupled to the tray compartment of a pet litter box.

In use, a mass of absorbent material or kitty litter KL is deposited within the confines of the interior space 17 of the main compartment 12 and the pet litter tray 10 is slid into the tray compartment TC of a pet litter box LB, as shown in FIG. 7. Alternatively, if the pet litter tray 10 is used alone, it is placed on the floor or other support surface at a selected location. The pet litter tray 10 initially is in an in-use configuration with the end flaps 16 folded down and positioned against the end walls 24 and held in position by end fasters 39. The side flaps 14 are also folded along the first folds 36 so that the first portions 34 and second portions 38 are positioned to overlay the floor 20, the third portions 42 are folded along the third folds 44 so as to overlay the first portions 34 and second portions 38, and the fourth portions 46 are folded along fourth folds 48 so as to overlay the side walls 22 of the main compartment 12, as best shown in FIGS. 1 and 2. The fourth portions 46 are maintained in a position overlaying the side walls 22 through the fastening or securing of the first fasteners 62 to the second fasteners 66.

Figure 3:
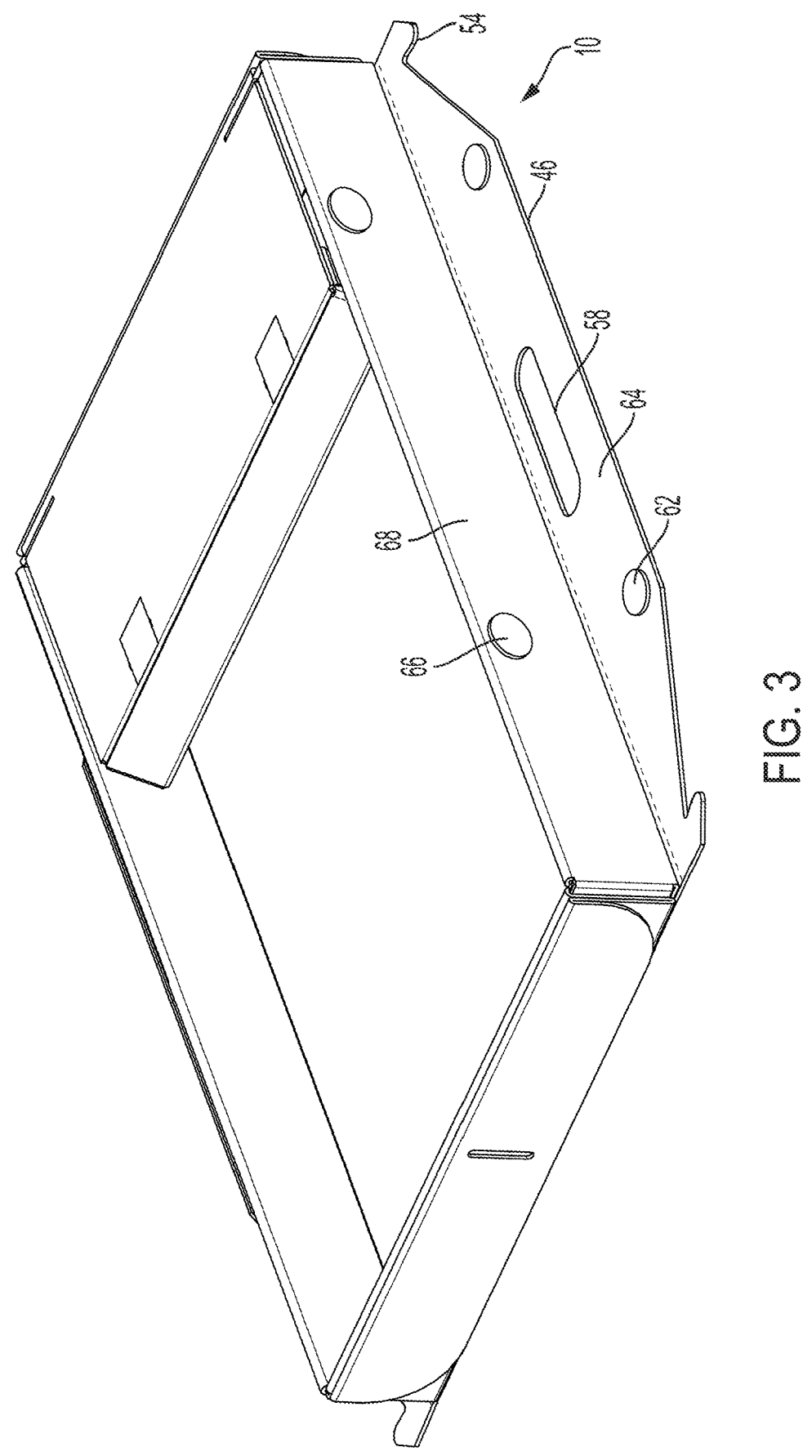
FIGS. 3-6 are a series of perspective views of the pet litter tray of FIG. 1, showing multiple steps in reconfiguring the pet litter tray from an in-use configuration to a portable, stowed configuration.

Once it has been determined that the kitty litter has exhausted its useful life, the pet litter tray 10 is removed from the litter box LB and the litter tray 10 is converted or reconfigured from its in-use configuration to a disposal, stowed, or portable configuration for transport and disposal. To do so, the pet litter tray 10 is slid out of the tray compartment TC of the pet litter box LB in conventional fashion, which may entail opening a covering door. The first fasteners 62 are then released from the second fasteners 66 so that the fourth portions 46 may be pivoted outwardly about fourth folds 48 to a position spaced from the side walls 22, as shown in FIG. 3.

Figure 4:
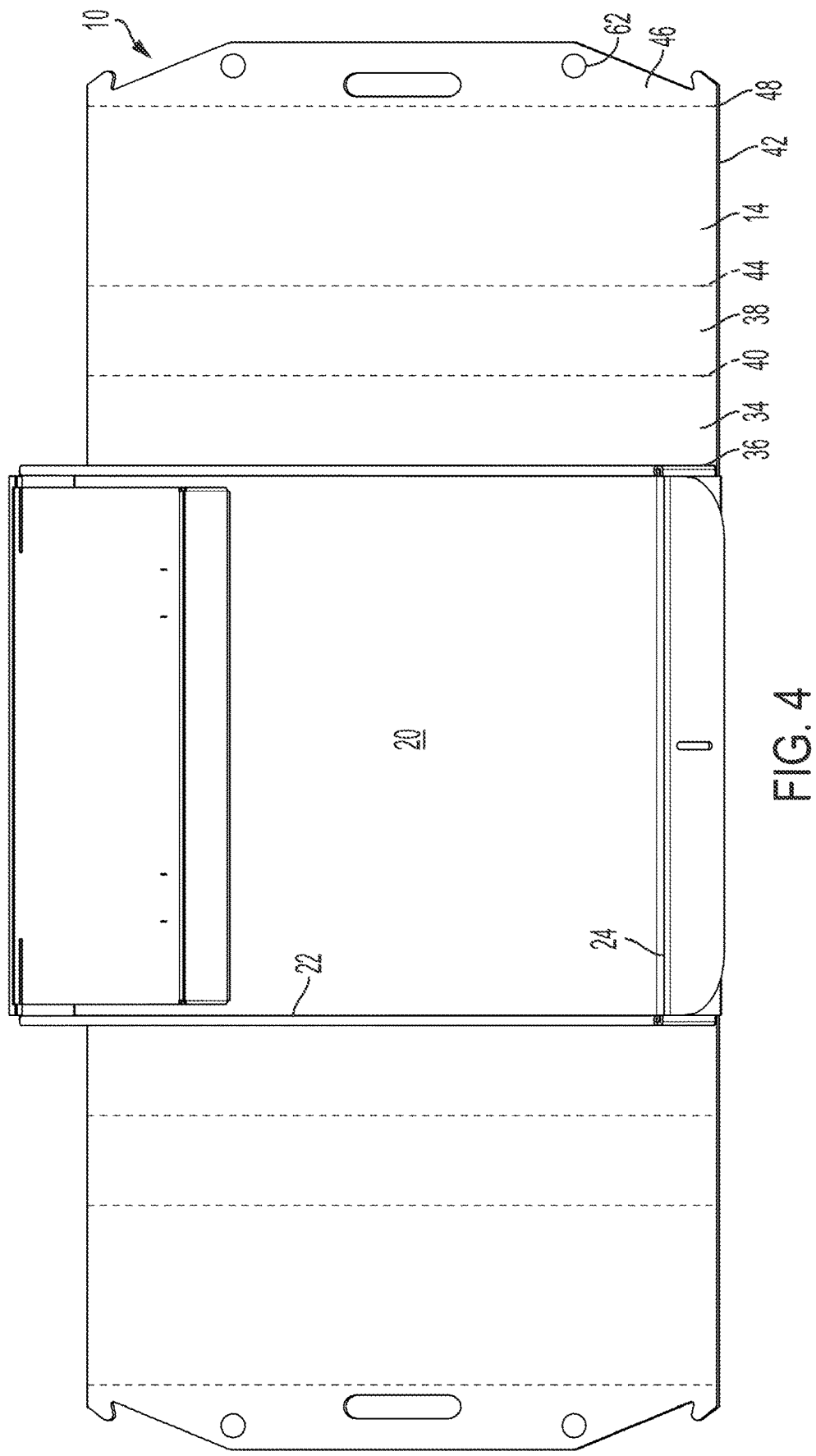

The pet litter tray 10 is then raised so that the side flaps 14 may be pivoted outwardly along first folds 36 and the third portions 42 are pivoted along third folds 44, so that the side flaps 14 extend generally laterally from the main compartment 12, as shown in FIG. 4. Alternatively, the fourth portions 46 are grasped and pulled outwardly away from each other, thereby causing the sequential pulling, unfolding. and movement of the third portion 42, second portions 38 and first portions 34 from beneath the floor 20.

Figure 5:
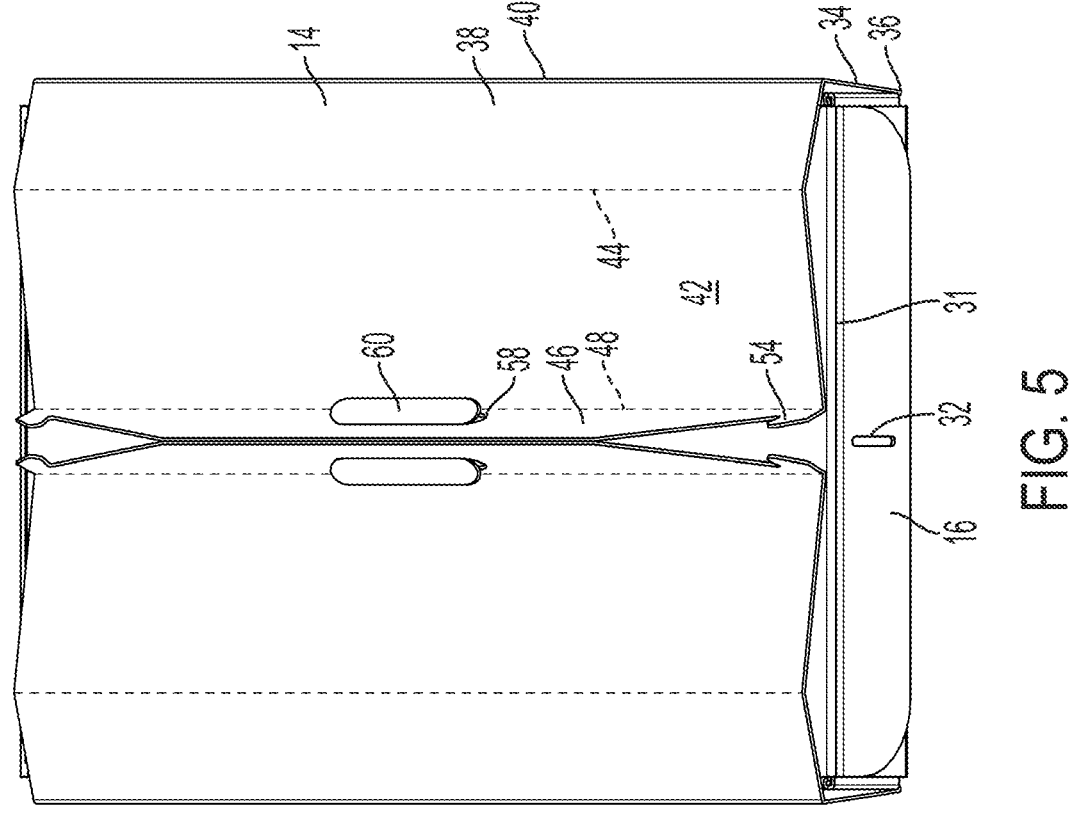

The first portions 34 are then pivoted or folded inwardly along first folds 36 so as to be positioned against or overlaying the side walls 22. The second portions 38 are then pivoted or folded inwardly along second folds 40 so that the second portions 38 and third portions 42 are positioned to cover, be positioned over, or overlay and enclose the open top 18 of the main compartment 12. The fourth portions 46 are then pivoted or folded outwardly along fourth folds 48 so that the two fourth portions 46 overlay each other, as shown in FIG. 5. Thus, the second portions 38 and third portions 42 each cover a section of the open top 18. The opening flap 60 of one fourth portion 46 may be pivoted into the handle opening 58 of the opposite fourth portion 46 to maintain the fourth portions 46 in this joined position. It should be noted that the term "overlay" or "overlaying" as used herein means to be positioned generally flush with another structure, whether positioned directly over, directly under, or directly besides each other.

Figure 6:
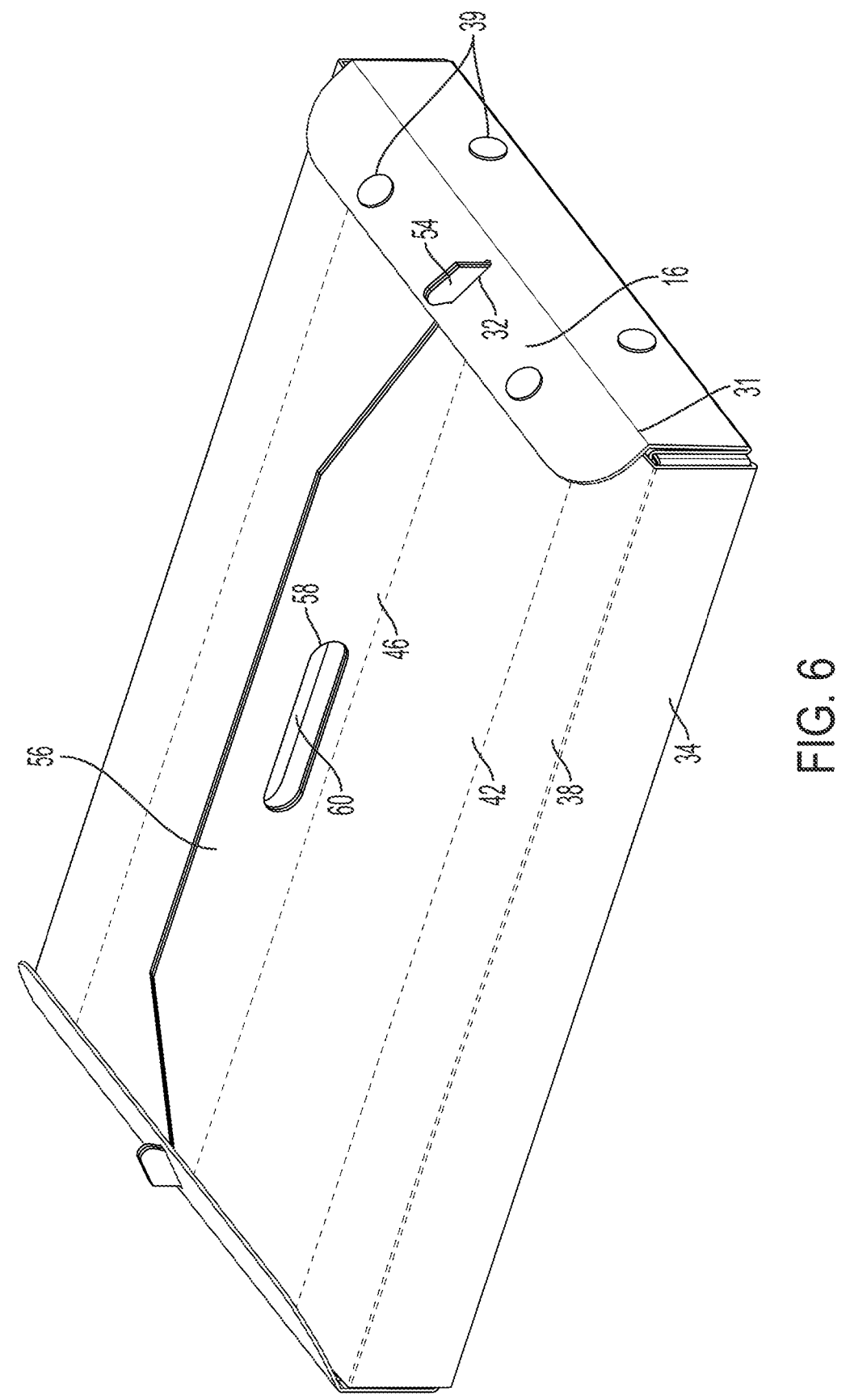

With the fourth portions 46 overlapping each other, each pair of end tabs 54 from one fourth portion 46 overlaps the other pair of end tabs 54 from the other fourth portion 46. The end flaps 16 are then released from the end walls 24 by disengaging releasable fasteners 39 and pivoted or folded outwardly about end fold 31 so that the end tabs 54 are positioned through the tab mounting slots 32 of the end flaps 16, as shown in FIG. 6. The configuration of the end tabs 54 and handle portions 56 locks the position of the end flaps 16 onto the side flaps 14 by preventing the end flaps 16 from pivoting back along the end folds 31.

With the ends flaps 16 locked to the side flaps 14, the interior space of the main compartment 12 is generally encased to prevent spillage of the kitty litter KL from the interior space 17 of the main compartment. 12. The homeowner may then transport the entire pet litter tray 10 and encased kitty litter KL by grasping the handle portion 56. The entire pet litter tray 10 may be placed in a trashcan, within a plastic garbage bag, or any other disposal receptacle.

It should be understood that the first and second fasteners 62 and 66 may be configured so that the first fasteners 62 of one fourth portion 46 mates or meshes with the first fasteners 62 of the other fourth portion 46 so as to aid in maintaining the fourth portions 46 coupled together while in a portable configuration.

It should be understood that the litter tray 10 may also include a releasable fastener for maintaining the first portion 34, second portion 38 and third portion 42 underlying the floor 20 in their in-use configuration, as shown in FIG. 2. These additional fasteners may be conventionally known releasable fasteners such as hook and loop fasteners, adhesive strips, magnetic strips, or similar fasteners extending between the first portion 34 or second portion 38 and the floor 20. Alternatively, there may be a mechanical type coupler, such as a tie, string, rubber band, fastener, or other similar feature, extending between the adjacent side flaps 14 to maintain their relative positions while in the in-use configuration. As one example, a rubber band or elastic material 70 may be releasably coupled to the side flaps 14 so as to stretch between the side flaps 14 when in a in-use configuration, as shown in phantom lines in FIG. 2. In use, the elastic material simply rides up the second portions 38 and first portions 34 as the side flaps 14 are moved from their in-use configuration to their portable or stowed configuration. The elastic material resides in a position wrapped about the exterior of the side walls 22 (along the first fold 36) and end walls 24 along the bottom edge).

As an alternative, the pet litter box may be in the form of a box having a bottom portion or floor removed so that the litter box is positioned over the pet litter tray 10 so that the pet litter tray 10 becomes the floor of the pet litter box. Here, the pet litter box is simply lifted, pivoted, or rotated at one end to create a space below the pet litter box so that the pet litter tray 10 may be slid out from beneath the pet litter box.

Figure 8:
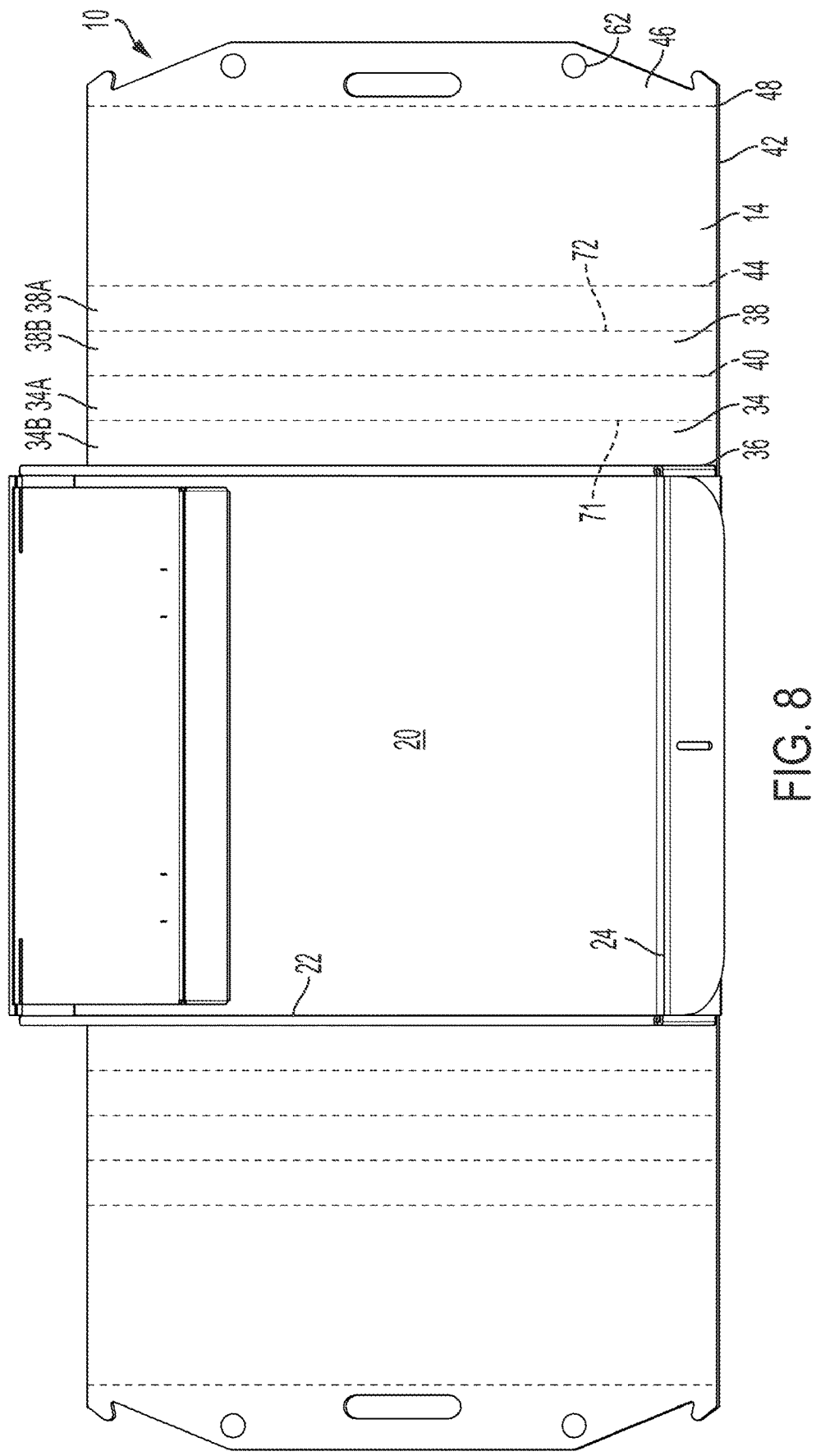
FIG. 8 is a perspective view of a pet litter tray embodying principles of the invention in another preferred form.

As another alternative, the side flaps 14 may include additional folds or score-lines 71 and 72 which divide or bifurcate the first portions 34 into bifurcated first portions 34A and 34B and second portions 38 into bifurcated second portions 38A and 38B, as shown in FIG. 8. The dividing of the first and second portions 34 and 38 reduces the width of each, thereby making the extraction process of the side flaps 14 from below the floor 20 easier as the pet litter tray 10 does not have to be raised or lifted as much.

Under an embodiment, the pet litter tray 10 may be made up of multiple parts and fastened together by various methods like mechanical fasteners, glue, adhesives, etc. These parts may be made from a combination of materials; for example, the box portion 12 could be formed from a sheet of cardboard or other similar material, while the end and/or side flaps 16 and 14 could be constructed from a thin plastic sheet fastened to box portion 12 (i.e., to end wall 24 and side wall 22 respectively) with mechanical fasteners, glue, or double sided tape. If the side flaps are constructed from a thin plastic sheet then they would not need to have the longitudinal second score line 40, because the thin plastic sheet should be flexible enough to slide out from underneath the litter tray. In other words, the use of a thin sheet of plastic material eliminates the need for the second folds 40, as the thin plastic material may easily bend during deployment or reconfiguration of the side flaps 14 from their in-use configuration to their portable configuration.

The disposable litter box comprises a main housing having two oppositely disposed end walls, two oppositely disposed side walls extending between the end walls, and a floor extending between end walls and the side walls, the main housing forming a top opening defined by the end walls and the side walls. The disposable litter box also has two oppositely disposed side flaps, each the side flap extending from one the side wall, each the side flap having a first portion extending from one the side wall along a first fold to be movable from an in-use position overlaying the floor to a stowed position overlaying the one side wall, a second portion extending from the first portion along a second fold to be movable from an in-use position overlaying the floor to a stowed position positioned over a first section of the main housing top opening, a third portion extending from the second portion along a third fold to be movable from an in-use position overlaying the first portion and the second portion and a stowed position over a second section of the main housing top opening, and a fourth portion extending from the third portion along a fourth fold to be movable from an in-use position overlaying the one side wall and a stowed position over the third portion.

It should be understood that as an alternative, the side flaps 14 may extend from the top edge of the side walls 22, which may result in reducing the number of side flap portions.

The disposable litter box has two oppositely disposed end flaps, each said end flap being couplable to said two oppositely disposed side flaps to maintain said two side flaps in a stowed position. At least one said end flap has a mounting slot and wherein each said side flap has an end tab configured to be received within said mounting slot.

The disposable litter box first portion of each said side flap has a longitudinally extending fifth fold and a longitudinally extending sixth fold.

The disposable litter box comprises a main housing having two oppositely disposed end walls, two oppositely disposed side walls extending between said end walls, and a floor extending between said end walls and said side walls, the main housing forming a top opening defined by said end walls and said side walls. The litter box also has two oppositely disposed side flaps, each the side flap extending from one the side wall, each the side flap having a first portion extending laterally from one the side wall along a first fold, a second portion extending laterally from the first portion along a second fold, a third portion extending laterally from the second portion along a third fold, and a fourth portion extending laterally from the third portion along a fourth fold, each the side flap being movable between an in-use position uncovering the top opening and a stowed position at least partially covering the top opening.

A disposable litter box comprises a main housing having four vertical walls and a floor extending between the four vertical walls, the main housing forming a top opening defined by the four vertical walls/The litter box also has two oppositely disposed side flaps extending from oppositely disposed side walls, each the side flap having a first portion extending from one the side wall along a first fold to be movable from an in-use position overlaying the floor to a stowed position overlaying the one side wall, a second portion extending from the first portion along a second fold to be movable from an in-use position overlaying the floor to a stowed position positioned over a first section of the main housing top opening, a third portion extending from the second portion along a third fold to be movable from an in-use position beneath the floor and a stowed position over a second section of the main housing top opening, and a fourth portion extending from the third portion along a fourth fold to be movable from an in-use position overlaying the one side wall and a stowed position over the third portion.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A disposable litter box comprising:
a main housing having two oppositely disposed end walls, two oppositely disposed side walls extending between said end walls, and a floor extending between said end walls and said side walls along oppositely disposed elongated, bottom corners, the main housing forming a top opening defined by said end walls and said side walls;
two oppositely disposed side flaps, each said side flap extending from one said side wall, each said side flap having a first portion extending from one said side wall along a first fold overlaying one said elongated, bottom corner to be movable from an in-use position overlaying said floor to a stowed position overlaying said one side wall, a second portion extending from said first portion along a second fold to be movable from an in-use position overlaying said floor to a stowed position positioned covering a first section of said main housing top opening, a third portion extending from said second portion along a third fold to be movable from an in-use position overlaying said first portion and said second portion and a stowed position covering a second section of said main housing top opening, and a fourth portion extending from said third portion along a fourth fold to be movable from an in-use position overlaying said one side wall and a stowed position over said third portion.

2. The disposable litter box of claim 1 further comprising two oppositely disposed end flaps, each said end flap being couplable to said two oppositely disposed side flaps to maintain said two side flaps in a stowed position.

3. The disposable litter box of claim 2 wherein at least one said end flap has a mounting slot and wherein each said side flap has an end tab configured to be received within said mounting slot.

4. The disposable litter box of claim 1 wherein said first portion of each said side flap has a longitudinally extending fifth fold.

5. The disposable litter box of claim 4 wherein said second portion of each said side flap has a longitudinally extending sixth fold.

6. The disposable litter box of claim 1 wherein said second portion of each said side flap has a longitudinally extending fifth fold.

7. The disposable litter box of claim 1 further comprising a covering panel extending from one said end wall that covers a section of said top opening.

8. A disposable litter box comprising:
a main housing having four vertical walls having bottom ends and a floor extending between said four vertical walls to form a peripheral bottom corner with said bottom ends of said vertical walls, said main housing forming a top opening defined by said four vertical walls, and
two oppositely disposed side flaps extending from oppositely disposed side walls, each said side flap having a first portion extending from one said side wall along a first fold overlaying one said bottom corner to be movable from an in-use position overlaying said floor to a stowed position overlaying said one side wall, a second portion extending from said first portion along a second fold to be movable from an in-use position overlaying said floor to a stowed position positioned over a first section of said main housing top opening, a third portion extending from said second portion along a third fold to be movable from an in-use position beneath said floor and a stowed position over a second section of said main housing top opening, and a fourth portion extending from said third portion along a fourth fold to be movable from an in-use position overlaying said one side wall and a stowed position over said third portion.

9. The disposable litter box of claim 8 further comprising two oppositely disposed end flaps extending from oppositely disposed side walls not having said side flaps, said end flaps being couplable to said two oppositely disposed side flaps to maintain said two side flaps in a stowed position.

10. The disposable litter box of claim 9 wherein at least one said end flap has a mounting slot and wherein each said side flap has an end tab configured to be received within said mounting slot.

11. The disposable litter box of claim 8 wherein said first portion of each said side flap has a longitudinally extending fifth fold.

12. The disposable litter box of claim 11 wherein said second portion of each said side flap has a longitudinally extending sixth fold.

13. The disposable litter box of claim 8 wherein said second portion of each said side flap has a longitudinally extending fifth fold.

14. The disposable litter box of claim 8 further comprising a covering panel extending from one said side wall that covers a section of said top opening.

* * * * *